Sept. 1, 1925.
R. R. JONES
1,551,669
DEVICE FOR CURING INNER TUBE SPLICES
Filed Sept. 20, 1924
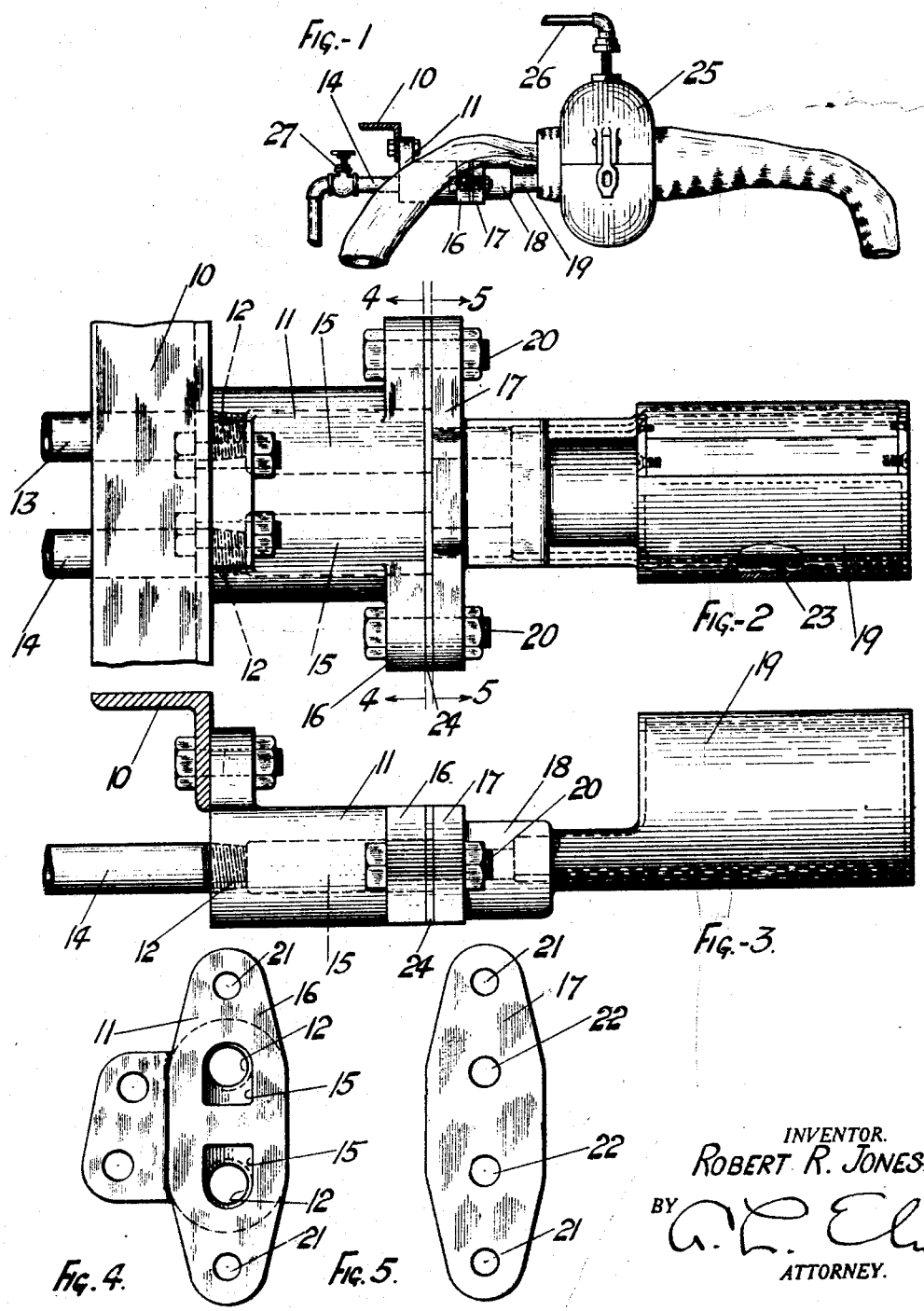
INVENTOR.
ROBERT R. JONES.
BY
ATTORNEY.

Patented Sept. 1, 1925.

1,551,669

UNITED STATES PATENT OFFICE.

ROBERT R. JONES, OF AKRON, OHIO, ASSIGNOR TO THE FIRESTONE TIRE AND RUBBER COMPANY, OF AKRON, OHIO, A CORPORATION OF OHIO.

DEVICE FOR CURING INNER-TUBE SPLICES.

Application filed September 20, 1924. Serial No. 738,810.

*To all whom it may concern:*

Be it known that I, ROBERT R. JONES, a citizen of the United States, residing at Akron, county of Summit, State of Ohio, have invented certain new and useful Improvements in Devices for Curing Inner-Tube Splices, of which the following is a specification.

This invention relates to devices for curing the splices of inner tubes of rubber during the course of their manufacture.

In the manufacture of inner tubes, a sheet of rubber is rolled onto a mandrel or pole, the tube thus formed is wrapped with material capable or shrinking under the action of steam and inserted in a chamber in which it is submitted to the action of steam under pressure until the rubber is vulcanized. After vulcanization, the wrapper is removed and the tube stripped from the pole or mandrel, the tube being turned inside out during this operation so that it will be smooth on its outer surface. The ends of the tube are then spliced together to form the inner tube, the device of the invention being adapted for curing these splices.

The object of the invention is to provide an improved construction for splice curing devices of a known type whereby they may be readily and interchangeably connected to a supply of steam and a drain.

Heretofore, great difficulty has been experienced in mounting the devices on the tube-curing rack for the reason that the steam and drain connections provided on the rack did not mate with the inlets and outlets in the mandrels of different splicers. Accordingly the services of a number of plumbers were required for considerable time whenever tubes of different sizes were to be cured for making the desired changes of mandrels on the rack. The invention has for its purpose, therefore, the elimination of this difficulty.

The foregoing and other objects will become more apparent as the following description is read in connection with the accompanying drawing, it being understood that the invention is not limited to the specific structure described and shown.

Of the accompanying drawings,

Figure 1 is a side elevation illustrating a splicer in use,

Figure 2 is an enlarged plan showing the manner of connecting the splicer mandrel to the tube-curing rack, Figure 3 is a side elevation thereof, Figure 4 is a section on line 4—4 of Fig. 2; and Figure 5 is a section on line 5—5 of Fig. 2.

Referring to the drawings, 10 is a rack having secured thereto an adapter member 11 provided with tapped apertures 12, 12 adapted to receive steam and drain pipe connections 13 and 14. The apertures 12 lead into passages 15, 15 of non-circular shape as shown in Figure 4 extending through the adapter 11 to an outer flange 16. The flange 16 is adapted to provide a seat for a corresponding flange 17 on an adapter member 18 which is secured as by welding onto a hollow splicer mandrel 19, otherwise of standard construction. The adapter members 11 and 18 are adapted to be secured together as by bolts 20, 20 extending through aligned apertures 21, 21 respectively in flanges 16 and 17. The adapter member 18 has passages 22, 22 therein adapted to establish communication from the passages 15 to the chamber 23 of the mandrel 19. A gasket 24 is preferably interposed between flanges 16 and 17. When an adapter is not in use a suitable closure plate (not shown) may be bolted onto flange 16 to prevent the escape of steam.

By the above described construction, it will be seen that all plumbing operations when mounting or changing splicer mandrels on the rack are avoided. The attendant is required only to bolt the required mandrels onto the adapters 11 which remain permanently on the rack. Passages 15 are of such shape in section, that the location of passages 22 may vary considerably in different mandrels, yet communication will be established through them to the mandrel without making changes in the plumbing.

In use, the tube is formed with the splice on the mandrel as indicated in Figure 1. An envelope section 25 (Figure 1) containing an annular expansible bag is clamped about the splice on the mandrel. Pressure is supplied the bag through a connection 26 and steam is supplied to the mandrel through the adapter 11, valves such as indicated at 27 being used to control the circulation of steam therein.

Modifications of the invention may be resorted to without departing from the spirit thereof or the scope of the appended claims.

What I claim is:

1. Apparatus for curing inner tube splices comprising a hollow mandrel, and connections for conducting a heated fluid into and draining it from the mandrel said connections including an adapter connected to supply and drain pipes and formed with passages having large outlets, said mandrel having corresponding but smaller inlet passages, a flange formed on the adapter and a corresponding flange formed on said mandrel, said flanges being bolted together so that the adapter passages and the mandrel passages will be substantially in alignment, and a gasket interposed between the flanges.

2. Apparatus for curing inner tube splices comprising a hollow mandrel, and connections for supplying a heated fluid to the interior of the mandrel, said connections including an adapter connected to a fluid supply, a passage in the adapter having a large outlet for conducting the fluid, said mandrel being formed with a corresponding passage having a smaller inlet, a flange on the adapter and a corresponding flange on the mandrel, the flanges being bolted together so that the passages will be in substantial alignment.

3. Apparatus for curing inner tube splices comprising a hollow mandrel having a small inlet passage formed therein, an adapter having a corresponding but larger passage therein for conducting a heated fluid to the mandrel, and means for securing the mandrel on the adapter with the passages in substantial alignment.

4. Apparatus for curing inner tube splices comprising a hollow mandrel provided with an inlet passage for conducting a fluid to the interior of the mandrel and a flange, an adapter provided with a fluid conducting passage larger than the first passage and a corresponding flange whereby the mandrel may be secured to the adapter by means engaging the flanges so as to place the passages in communication with each other.

5. Apparatus for curing inner tube splices comprising a rack, an adapter on the rack adapted to conduct a fluid, a supply pipe connected to the adapter, and a series of hollow mandrels, each adapted to be secured to the adapter said mandrels being adapted to receive the fluid from the adapter and being readily interchangeable on the adapter.

ROBERT R. JONES.